US012808723B2

(12) United States Patent
Bellanger et al.

(10) Patent No.: US 12,808,723 B2
(45) Date of Patent: Nov. 24, 2026

(54) OPTICAL COMPONENT AND WAVEFRONT ANALYZER COMPRISING SUCH AN OPTICAL COMPONENT

(71) Applicant: OFFICE NATIONAL D'ETUDES ET DE RECHERCHES AÉROSPATIALES, Palaiseau (FR)

(72) Inventors: Cindy Bellanger, Palaiseau (FR); Jérôme Primot, Palaiseau (FR); Thomas Rousseaux, Palaiseau (FR); Julien Jaeck, Palaiseau (FR); Bastien Rouze, Palaiseau (FR)

(73) Assignee: Office National d'Etudes et de Recherches Aérospatiales, Palaiseau (FR)

( * ) Notice: Subject to any disclaimer, the term of this patent is extended or adjusted under 35 U.S.C. 154(b) by 32 days.

(21) Appl. No.: 19/136,961

(22) PCT Filed: Dec. 1, 2023

(86) PCT No.: PCT/FR2023/051899
§ 371 (c)(1),
(2) Date: Jun. 9, 2025

(87) PCT Pub. No.: WO2024/134053
PCT Pub. Date: Jun. 27, 2024

(65) Prior Publication Data

US 2026/0202253 A1 Jul. 16, 2026

(30) Foreign Application Priority Data

Dec. 20, 2022 (FR) .................................. FR2213994

(51) Int. Cl.
*G01J 9/02* (2006.01)
*G01J 9/00* (2006.01)

(52) U.S. Cl.
CPC ....... *G01J 9/0215* (2013.01); *G01J 2009/002* (2013.01); *G01J 2009/0226* (2013.01)

(58) Field of Classification Search
CPC ............... G01J 9/0215; G01J 2009/002; G01J 2009/0226
See application file for complete search history.

(56) References Cited

U.S. PATENT DOCUMENTS 6,057,913 A 5/2000 Brown et al.
2019/0170576 A1* 6/2019 Guerineau ............ G01J 3/0297
(Continued)

FOREIGN PATENT DOCUMENTS

DE 102020215540 A1 6/2022
WO 2016042161 A1 3/2016

OTHER PUBLICATIONS

Search Report and Written Opinion issued on Mar. 19, 2024, in corresponding International Application No. PCT/FR2023/051899, 23 pages.
(Continued)

*Primary Examiner* — Tony Ko
(74) *Attorney, Agent, or Firm* — Maier & Maier, PLLC

(57) ABSTRACT

An optical component including a diffraction grating and an array of hexagonal microlenses that are angularly offset from one another by 100 to 50°. Such an optical component is particularly suitable for use in a wavefront analyzer. The wavefront analyzer can have two alternate configurations, where a distance between the optical component and an image sensor is close to f/2 or to 3·f/2, where f is a focal length of the microlenses. Such a wavefront analyzer can be compact, easy to use and compatible with a wide range of wavelength values for electromagnetic radiation to be analyzed.

15 Claims, 7 Drawing Sheets

(56) References Cited

U.S. PATENT DOCUMENTS

| | | | | |
|---|---|---|---|---|
| 2023/0259000 | A1* | 8/2023 | McManamon | G02F 1/292 359/316 |
| 2026/0202253 | A1* | 7/2026 | Bellanger | G01J 9/0215 |

OTHER PUBLICATIONS

Search Report issued on Aug. 1, 2023, in corresponding French Application No. 2213994, 7 pages.
Brignon et al., "Collective Techniques for Coherent Beam Combining of Fiber Amplifiers", Coherent Laser Beam Combining, Wiley-VCH Verlag GmbH & Co. KGaA, XP093022035, Aug. 2, 2013, pp. 137-165.
Deprez, "Metrology Means for the Design and Evaluation of Hyper-Intense Laser Chains Using the Coherent Recombination of Elementary Lasers", Universite Paris-Saclay, XP093069181, Sep. 6, 2018, 214 pages, with English Abstract.

* cited by examiner

OPTICAL COMPONENT AND WAVEFRONT ANALYZER COMPRISING SUCH AN OPTICAL COMPONENT

TECHNICAL FIELD

The present description relates to an optical component which is suitable for use in a wavefront analyzer. It also concerns the wavefront analyzer, as well as a method for analyzing a wavefront of electromagnetic radiation that uses this analyzer.

BACKGROUND

Many applications require characterizing the shape of an electromagnetic radiation wavefront. One such application involves combining beamlets of radiation from separate light sources to produce a final beam whose power is greater, or even much greater, than that of each beamlet produced individually by one of the light sources. Another application is the height and tilt adjustment of separate, juxtaposed mirror segments, to form a large mirror that is free of jumps in height and slope discontinuities between neighboring segments.

Throughout this description, the term "wavefront" of electromagnetic radiation refers to a surface, usually continuous, wherein the phase of the electric field of a spectral component of the radiation is constant. A device that is able to provide information about the local shape of a wavefront is called a wavefront analyzer.

Shack-Hartmann wavefront analyzers have been around for a long time. They use an array of identical, juxtaposed microlenses arranged in the path of radiation propagation so that each microlens focuses the radiation in a direction that is locally perpendicular to the wavefront, in accordance with the orientation that the wavefront has at that microlens. Variable local tilts of the wavefront in the microlens array cause shifts in the image points at which radiation is focused by the microlenses, within a focal plane that is common to all of the microlenses. These focal points, also known as convergence points, are imaged using an image sensor, and their positions directly indicate the inclination of the wavefront that exists at each microlens. In this application, a Shack-Hartmann wavefront analyzer only provides information on the local tilt of the portion of the wavefront passing through each microlens.

Document WO 2016/042161 A1, in the name of the applicant of the present patent application, describes another wavefront analyzer whose principle is different from that of Shack-Hartmann. This other analyzer comprises a mask with separate apertures and a diffraction grating arranged downstream of the mask apertures. The diffraction grating divides each beam of incident radiation that has passed through one of the mask apertures into several sub-beams, then superimposing sub-beams that originate from neighboring mask apertures. Each superposition of sub-beams forms an interference pattern, called an interferogram. This interferogram consists of parallel fringes whose orientation depends on the deviation in inclination of the wavefront between the apertures from which the sub-beams originate. The value of the interfringe is used to determine this deviation in inclination, commonly referred to as tilt deviation. At the same time, a transverse shift affecting the central fringe of the interferogram makes it possible to determine a wavefront advance deviation, commonly known as the piston deviation, which exists between the apertures from which the sub-beams originate. Interferograms are captured using an image sensor, preferably of the matrix image sensor type, which is arranged so that all the interferograms appear on its photosensitive surface. In the wavefront analyzer of WO 2016/042161 A1, the diffraction grating has a beam-splitting function, to generate the sub-beams that are then superimposed two-by-two to form the interferograms. The aperture mask limits each sub-beam transversely, so that two interferograms that are adjacent on the image sensor do not overlap.

An advantage of the wavefront analyzer of WO 2016/042161 A1 over Shack-Hartmann analyzers is that it gives direct access to piston deviation values. Using a Shack-Hartmann wavefront analyzer with microlens array, the tilt deviation values of the wavefront are deduced from the focal point displacements, then the piston deviation values are calculated by interpolation and integration from the tilt deviation values. This results in a significant uncertainty in each piston deviation value calculated from measurements made using a Shack-Hartmann analyzer, due to the greater or lesser curvature that the wavefront may have locally.

But, in the wavefront analyzer of WO 2016/042161 A1, the opaque parts of the mask, between its apertures, cause a significant loss of area in the wavefront to be analyzed. This loss of area has the following two disadvantages:

- a loss of light intensity in interferograms, which is troublesome when the electromagnetic radiation to be analyzed has limited or low intensity; and
- the piston and tilt deviation values obtained relate to local parts of the wavefront which are reduced and spaced apart with intermediate bands which do not contribute to the piston and tilt deviation values obtained.

From this situation, one aim of the present invention is to propose an improvement to the wavefront analyzer of WO 2016/042161 A1, to eliminate or reduce the disadvantages just mentioned.

Another aim of the invention is to provide wavefront analyzers that are compact, easy to use and each compatible with a wide range of wavelength values for the radiation to be analyzed.

In particular, the purpose of the invention is to provide a new optical component which is specially adapted to form part of an improved wavefront analyzer.

SUMMARY

To achieve at least one or another of these aims, a first aspect of the invention proposes an optical component that comprises:

- a diffraction grating, which is hexagonal and has a repeating pitch of a diffraction pattern along three axes of symmetry of the diffraction grating; and
- a microlens array, which is also hexagonal, is made up of identical converging microlenses, and has a microlens pitch along three axes of symmetry of the microlens array.

The optical component of the invention is arranged so that the diffraction grating is superimposed on the microlens array in a plane called the superposition plane, or in that an image of the diffraction grating is superimposed on the microlens array in the superposition plane. In addition, the diffraction grating and microlens array are oriented so that in the superposition plane, each axis of symmetry of the diffraction grating, or an image of each axis of symmetry of the diffraction grating, is angularly offset from one of the axes of symmetry of the microlens array by an angle which is between 10° (degree) and 50°. In other words, any axis of symmetry of the diffraction grating, or the image of any axis of symmetry of the diffraction grating, forms with any axis of symmetry of the microlens array, within the superposition plane, an angle that is between 10°+n·60° and 50°+n·60°, where n is an integer between −6 and +6. Preferably, each axis of symmetry of the diffraction grating, or its image, forms an angle of approximately 30° with one of the axes of symmetry of the microlens array. It then forms an angle with any axis of symmetry of the microlens array that is roughly equal to 30°+n·60°, where n has the same meaning as above.

According to a further feature of the optical component of the invention, a quotient of the microlens pitch over the repetition pitch of the diffraction pattern, or over a repetition pitch of an image of the diffraction pattern in the superposition plane, is between 2 and 18, the values 2 and 18 being included.

When placed in a beam of electromagnetic radiation, preferably substantially perpendicular to an average direction of propagation of this radiation, the optical component of the invention divides each part of the beam passing through one of the microlenses into at least six sub-beams, each of which interferes with a sub-beam originating from a neighboring microlens, the interference occurring downstream of the superposition plane with respect to the direction of propagation of the radiation. Sampling of the wavefront for piston and tilt deviation values is produced by the microlens matrix, so that a minimal portion of the wavefront is incident on any gaps that may exist between the microlenses. This sampling can then be particularly dense, especially when the microlenses are contiguous with one another and have an individual size that is small.

In addition, all the light energy of the radiation to be analyzed can be used to characterize the shape of its wavefront when the microlenses have a 100% filling ratio in this wavefront. In other words, it can be particularly advantageous if the microlenses each have a peripheral shape and a size parallel to the superposition plane which are such that the microlens array constitutes a tiling in this superposition plane. Preferably, each microlens can thus have a hexagonal peripheral shape.

The additional feature of the optical component of the invention, according to which the quotient of the microlens pitch over the repetition pitch of the diffraction pattern, or over the repetition pitch of an image of the diffraction pattern in the superposition plane, is between 2 and 18, ensures that the interference of the sub-beam pairs produces fringe numbers that are suitable for enabling piston and tilt deviation values to be determined with satisfactory accuracy.

In preferred embodiments of the optical component of the invention, the diffraction grating can be carried by the microlens array. In particular, the diffraction grating can be engraved or printed on the microlens array or on a transparent film, or on a rigid transparent substrate, this film or substrate being bonded to the microlens array. Alternatively, the diffraction grating can be inscribed, in particular by photoinscription, in the microlens array or in a transparent film or rigid transparent substrate that is bonded to the microlens array. Embodiments of the photoinscription diffraction grating may in particular be suitable when this diffraction grating is of the diffracting phase grating type.

In other possible embodiments of the optical component of the invention, at least one of the diffraction grating and microlens array can be realized by means of a spatial light modulator. Such a spatial light modulator may be of the spatial phase modulator type. It is even possible for the two diffraction and microlens arrays to be realized together using a single spatial light modulator, in particular a single spatial phase modulator.

The optical component of the first aspect of the invention is adapted to form part of an interference wavefront analyzer, but can also be supplied separately from other components of such an analyzer. In this case, at least one indication of use for forming an interference wavefront analyzer can be provided with the optical component, notably in a leaflet which is attached to this component or via an internet link when the indication of use is provided in electronic form. This indication can include a wavelength value λ which is prescribed for a beam of electromagnetic radiation to be analyzed which is intended to pass through the optical component when the latter is used in an interference wavefront analyzer, the optical component producing, during this use, interference between sub-beams which emerge from the diffraction grating and have passed through neighboring microlenses in the microlens array. Thus, when such an indication of a prescribed wavelength value is provided, the optical component may have one of the following two dimensional characteristics:

- according to a first possibility, the repetition pitch of the diffraction pattern, or the repetition pitch of the image of the diffraction pattern in the superposition plane, is between $\lambda \cdot f/(2 \cdot 3^{1/2} p_{11})$ and $4 \cdot \lambda \cdot f/(3^{1/2} \cdot p_{11})$, that is, between approximately $0.29 \cdot \lambda \cdot f/p_{11}$ and $2.31 \cdot \lambda \cdot f/p_{11}$, where f is a focal length of each microlens and $p_{11}$ is the pitch of these microlenses, so that interference exists in a plane that is parallel to the superposition plane and distant from this superposition plane by f/2. For this reason, an interference wavefront analyzer obtained in this first way is said to have an f/2 configuration; or
- according to a second possibility, the repetition pitch of the diffraction pattern, or the repetition pitch of the image of the diffraction pattern in the superposition plane, is between $4 \cdot \lambda \cdot f/(3^{1/2} p_{11})$ and $8 \cdot 3^{1/2} \cdot \lambda \cdot f/p_{11}$, that is, between approximately $2.31 \cdot \lambda \cdot f/p_{11}$ and $13.86 \cdot \lambda \cdot f/p_{11}$, where f is again the focal length of each microlens and $p_{11}$ the pitch of these microlenses, so that interference exists in another plane which is parallel to the superposition plane and distant from this superposition plane by 3·f/2. For this reason, another wavefront interference analyzer which is obtained according to this second possibility, alternative to the first possibility but from the same optical component, is said to have a 3·f/2 configuration.

These two configurations, f/2 and 3·f/2, make optimum use of the photosensitive surface of a wavefront analyzer image sensor, reducing unused areas of this photosensitive surface while avoiding overlaps between neighboring interferograms. For the f/2 configuration, the optimum value for the diffraction pattern repeat pitch and the prescribed wavelength value λ are linked by the following nominal relationship: $p_{12}=2 \cdot \lambda \cdot f/(3^{1/2} \cdot p_{11})$, where $p_{12}$ denotes the diffraction pattern repeat pitch along the axes of symmetry of the diffraction grating in the superposition plane, and $p_{11}$ denotes the microlens pitch along the axes of symmetry of the microlens array. For the 3·f/2 configuration, the nominal relationship is: $p_{12}=2 \cdot 3^{1/2} \lambda \cdot f/p_{11}$. But one advantage of a wave-surface analyzer that is built up from an optical component in accordance with the invention is that it can be used even when the wavelength of the radiation to be analyzed differs significantly from the prescribed value λ as resulting from the nominal relationships.

The prescribed wavelength value λ, for use of the optical component in an interference wavefront analyzer, can be in the visible range, between 0.36 μm (micrometer) and 0.8 μm, or in the infrared range, between 0.8 μm and 20 μm, or in the terahertz range, between 20 μm and 3 mm (millimeter), or in the ultraviolet range, between 124 nm (nanometer) and 0.36 μm, or in the extreme-ultraviolet range, designated EUV and between 10 nm and 124 nm, or even in the X-ray range, with wavelength values below 10 nm.

When such a prescribed value λ is provided with the optical component, its diffraction pattern can advantageously be adapted to produce, on a spectral component of the radiation beam to be analyzed which has the prescribed value λ as its wavelength value, a phase shift which is substantially equal to +/−pi (π) radians, between two complementary zones within the diffraction pattern and for a direction of propagation of the beam which is perpendicular to the superposition plane. This phase shift can be produced by a local increase or reduction in the optical thickness of the diffraction grating in one of the two zones relative to the other within the diffraction pattern. Advantageously, when the grating pitch, denoted $p_{12}$, is equal to $2\cdot\lambda\cdot f/(3^{1/2}\cdot p_{11})$ and the optical component is intended for use in an f/2 configuration wavefront analyzer, or when the diffraction grating pitch $p_{12}$ is equal to $2\cdot 3^{1/2}\lambda\cdot f/p_{11}$ and the optical component is intended for use in a wavefront analyzer with a 3 f/2 configuration, one of the two complementary zones within the diffraction pattern can be a disk with a diameter substantially equal to $7.66\cdot p_{12}\cdot 3^{1/2}/(6\cdot\pi)$. Such a diffraction pattern reduces additional superpositions that could occur in each interferogram, with sub-beams originating from microlenses of rank i+3 when this interferogram corresponds to the superposition of sub-beams originating from microlenses of rank i and +1, i being an integer numbering index of the microlenses that lie successively along one of the axes of symmetry of the microlens array. Analysis of the interferogram to obtain the piston deviation and/or tilt deviation values is then easier and more accurate.

A second aspect of the invention proposes an interference wavefront analyzer, which comprises:

- an optical component that conforms to the first aspect above;
- an image sensor, which has a planar photosensitive surface and is arranged so that this photosensitive surface is parallel to the superposition plane of the optical component, so that interferograms produced on the photosensitive surface by a beam of electromagnetic radiation to be analyzed, which passes through the optical component towards the image sensor when the wavefront analyzer is used, are captured by the image sensor; and
- optionally to provide automated interferogram analysis operation, a processing module, adapted to determine piston deviation values, and possibly also tilt deviation values, which exist at the superposition plane in a wavefront of the radiation beam to be analyzed, from the interferograms captured by the image sensor.

Such a wavefront analyzer can be simple and space-saving. In particular, its optical part can be limited to the optical component of the first aspect of the invention and to the image sensor. In addition, the optical component and the image sensor can be supplied separately, and combined in accordance with indications supplied with the optical component to form the wavefront analyzer.

When in use, the processing module can be adapted to deduce a value for the piston deviation existing in the wavefront between two zones of this wavefront which are superimposed on neighboring microlenses, from a transverse shift of fringes existing in one of the interferograms which corresponds to these two microlenses. It can also be adapted to deduce values of tilt deviations existing between the two zones of the wavefront from a fringe orientation and an interfringe pitch, respectively, existing in the interferogram corresponding to the two microlenses.

Advantageously, the prescribed wavelength value λ is supplied with the optical component and the repetition pitch of the diffraction pattern belongs to one of the aforementioned respective intervals for the f/2 configuration and for the 3·f/2 configuration of the wavefront analyzer. Thus, when this repetition step of the diffractive pattern is in the range corresponding to the f/2 configuration, a separation distance between the superposition plane and the photosensitive surface of the image sensor can be between f/8 and 5·f/8. Alternatively, when the repetition step of the diffraction pattern is in the range corresponding to the 3·f/2 configuration, the separation distance between the superposition plane and the photosensitive surface of the image sensor can be between 5·f/4 and 15·f/8.

When the prescribed wavelength value λ is between 0.36 μm and 20 μm, that is, it belongs to the visible or infrared range excluding the Terahertz range, the microlens array and the photosensitive surface of the image sensor can be separated by a distance that is less than 5 cm (centimeter), preferably between 1 mm and 30 mm.

Advantageously, to enable easy use of the wavefront analyzer, it can further comprise a mount wherein the microlens array and the diffraction grating, together forming the optical component, are rigidly assembled with the image sensor.

Finally, a third aspect of the invention proposes a method for analyzing a wavefront of a beam of electromagnetic radiation, which comprises the following steps:

- providing an optical component which conforms to the first aspect of the invention;
- directing the beam of radiation through the optical component;
- arranging an image sensor downstream of the optical component with respect to a direction of propagation of the radiation beam, so that a photosensitive surface of the image sensor intersects sub-beam superposition volumes produced by the optical component from the radiation beam;
- activating the image sensor to capture interferograms; and
- from the captured interferograms, determining piston deviation values and optionally also tilt deviation values that exist at the superposition plane in the wavefront of the radiation beam.

When the prescribed wavelength value λ is supplied with the optical component and when the repetition pitch of the diffraction pattern belongs to one of the aforementioned respective intervals for the f/2 configuration and for the 3·f/2 configuration of the wavefront analyzer, the method may comprise an initial step in which one of a source assembly of the radiation beam to be analyzed and the optical component is selected relative to the other so that a wavelength value of the source assembly is close to the prescribed value λ of the optical component, so as to produce the interferograms. In fact, an optical component conforming to the invention can be used for radiation to be analyzed whose wavelength is substantially different from the prescribed value λ of the optical component. The image sensor is then arranged downstream of the optical component to form a wavefront analyzer with f/2 or 3·f/2 configuration. For example, an optical component with a prescribed value λ of 633 nm can be used for radiation to be analyzed with a wavelength equal to 612 nm, and an optical component with a prescribed value λ equal to 1 μm can be used for radiation to be analyzed with a wavelength equal to 1.5 μm. Optimally, the source assembly is such that the radiation it produces has a spectral component of non-zero intensity for the wavelength value λ that is prescribed for the optical component.

In the first possible applications of the method described in the invention, parts of the radiation beam passing through different microlenses are generated by separate respective sources, in particular by separate fiber sources, and more particularly by separate fiber laser sources, in the continuous or pulsed emission regime. The aim of these first applications may be to superimpose or juxtapose, in a final beam, beamlets of radiation produced respectively by the separate sources, with the respective phases of the beamlets coinciding so that the final beam has maximum power. The wavefront analyzer of the invention can be used to measure piston and/or tilt deviations between beamlets directed through neighboring microlenses, so that the phase shifts resulting from these piston and/or tilt deviations can be compensated for by a suitable system.

In a second possible use of the method, the radiation is simultaneously reflected by juxtaposed segments of a mirror. Thus, for each mirror segment, part of the radiation reflected by that mirror segment passes through one of the microlenses in a one-to-one correspondence between the mirror segments and the microlenses. For these second applications, the method also includes calculating height and tilt deviations between two adjacent mirror segments, based on the piston and tilt deviation values that have been determined.

BRIEF DESCRIPTION OF THE FIGURES

The features and advantages of the present invention will become clearer in the following detailed description of non-limiting embodiments, with reference to the appended figures, among which.

DETAILED DESCRIPTION

For the sake of clarity, the dimensions of the elements shown in these figures do not correspond to actual dimensions or dimension ratios. In addition, some of these elements are shown only symbolically, and identical references shown in different figures designate elements that are identical or have identical functions.

Figure 1:
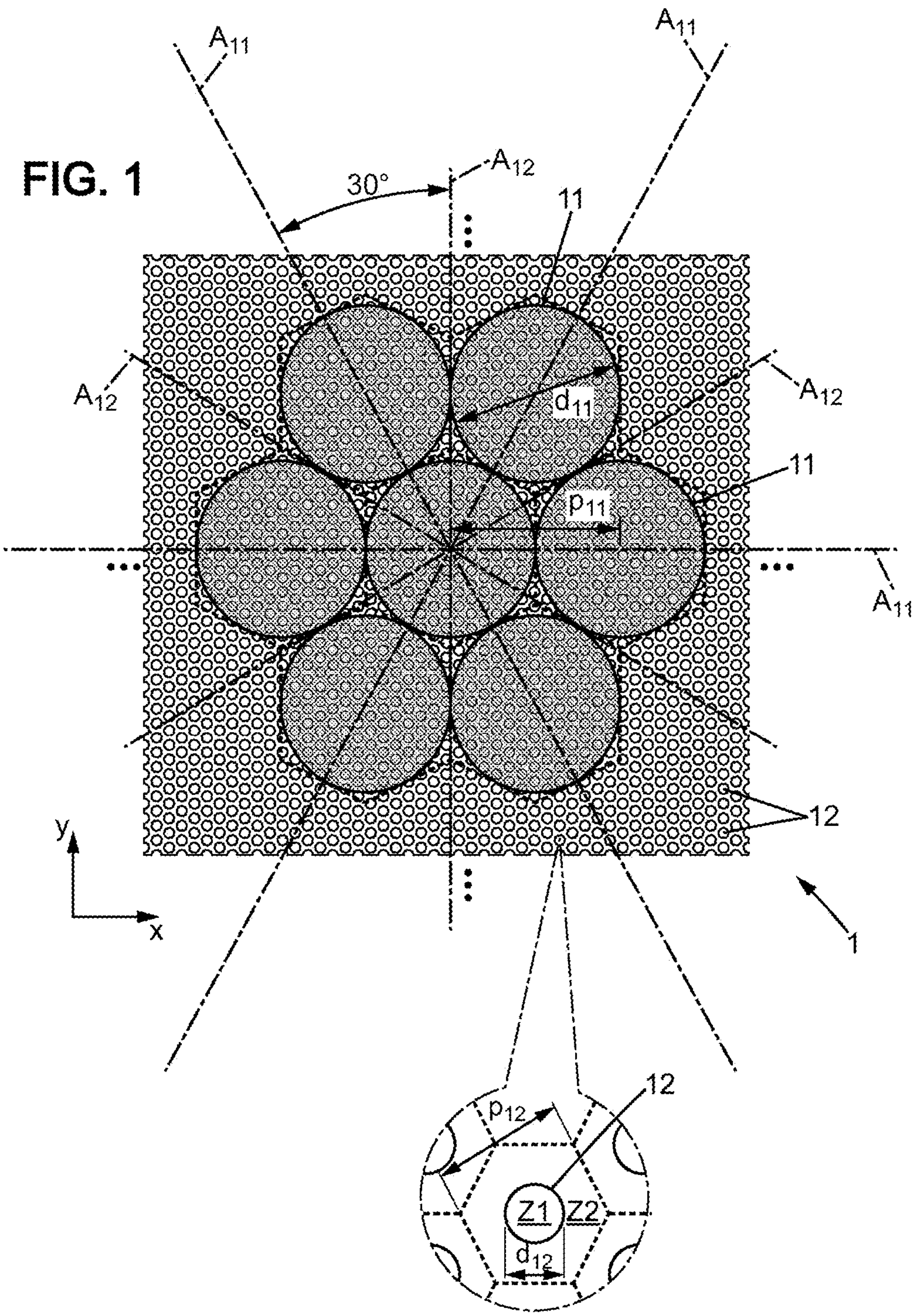
FIG. 1 is a plan view of an optical component according to the invention.

[FIG. 1] shows a superimposed diffraction grating and part of a microlens array, which together constitute an optical component 1 as proposed by the present invention. The microlenses are all identical, converging, and juxtaposed in a first hexagonal array. The representation of this microlens array is limited to seven microlenses in [FIG. 1], for the sake of clarity. Each microlens is individually designated by reference 11, and has a diameter $d_{11}$ and a focal length f. The references $A_{11}$ designate the axes of symmetry of the microlens array 11, which are offset by +/−60° from one axis $A_{11}$ to the other. The microlenses 11 are juxtaposed parallel to the axes of symmetry $A_{11}$ to form their hexagonal array. The juxtaposition pitch of microlenses 11 parallel to each axis of symmetry $A_{11}$ is denoted $p_{11}$. In the example shown, it is equal to the diameter $d_{11}$ of the microlenses, so that two adjacent microlenses 11 are contiguous with a single point of contact between them in the plane of the microlens array. However, the diameter $d_{11}$ of the microlenses can be smaller than their juxtaposition pitch $p_{11}$, or each microlens 11 can occupy an entire hexagonal mesh of their network.

The diffraction grating is also hexagonal, consisting of repetitions of a diffraction pattern parallel to the axes of symmetry $A_{12}$ of the diffraction grating. The axes of symmetry $A_{12}$ of the diffraction grating are therefore also shifted by +/−60° from one axis of symmetry $A_{12}$ to the other. The diffraction pattern has a contour in the shape of a regular hexagon, as shown in dashed lines in the local magnification inset of the figure. This diffraction pattern can be divided into two complementary zones Z1 and Z2, zone Z1 having the shape of a disk 12 of diameter $d_{12}$, which is centered in the pattern. In the case of a diffraction grating of the phase grating type, the diffraction pattern can be characterized by a first optical thickness inside the disk 12, that is, in the zone Z1, and by a second optical thickness, which is different from the first, in the zone Z2. For example, the diffraction grating can be formed by a plate of transparent material, with faces that are initially parallel, and wherein flat-bottomed holes have been formed at the zones Z1. In this way, the diffraction grating has an optical thickness that is reduced in zones Z1 compared with zones Z2. Alternatively, each disk 12 can be raised relative to the zones Z2 that are intermediate between the disks 12, so that the diffraction grating has an optical thickness that is increased in the zones Z1 relative to the zones Z2. Such a diffraction grating with the disks 12 in relief can be formed by selective etching, masking the zones Z1. Other embodiments are still possible for the diffraction grating, some of which have been mentioned in the general part of this description. $p_{12}$ designates the repetition pitch of the diffraction pattern parallel to the axes of symmetry $A_{12}$. As is known, the phase shift produced by a hole or relief in the plate of transparent material forming the diffraction grating is: $\Delta\varphi=2\cdot\pi\cdot(n-1)\cdot h/\lambda$, where h is the depth of the hole or the height of the relief, λ is the wavelength of the radiation, and n is the refractive index of the transparent material. This phase shift Δφ is a phase advance in the case of a hole and a phase delay in the case of a relief. In possible embodiments, the value of depth or height h can be selected so that $\Delta\varphi=\pm\pi$.

In the exemplary embodiment of the invention described here, the diffraction grating and the microlens array are arranged one against the other, so that they can be considered to be superimposed in a common plane, called the superposition plane and denoted PS. In addition, they are oriented with respect to one another so that each axis of symmetry $A_{11}$ of the microlens array 11 is angularly offset by 30° with respect to one of the axes of symmetry $A_{12}$ of the diffraction grating. Furthermore, again for the embodiment that is described here by way of example, the pitch $p_{11}$ of the microlens array 11 is equal to approximately 12 times the repetition pitch $p_{12}$ of the diffractive pattern. x and y designate two Cartesian axes perpendicular to one another that are contained in the superposition plane PS. In the following, z denotes a third Cartesian axis, perpendicular to the x and y axes.

For electromagnetic radiation that propagates substantially parallel to the z axis, a wavefront of this radiation that exists at the superposition plane PS is referred to as S in the following. The wavefront S can have a local advance along the z axis that varies between different points on this wavefront. In [FIG. 2], $z_1$ is thus the local advance of one part S1 of the wavefront S, and $z_2$ is the local advance of another part S2 of the wavefront S. The advance deviation of the wavefront S between its parts S1 and S2 is then $\Delta P=z_1-z_2$, and is called the piston deviation that exists between these two wavefront parts. Piston deviation values ΔP will be determined using the invention, between portions of the wavefront S that are superimposed on neighboring microlenses 11 within the optical component 1.

In addition to its local advance parallel to the z axis, which can be variable, the wavefront S can have a local inclination that is also variable. Thus, the wavefront portion S1 can form an angle $t_{x1}$ with a projection of the x-axis in a first cutting plane that is parallel to the x- and z-axes, and simultaneously form another angle $t_{y1}$ with a projection of the y-axis in a second cutting plane that is parallel to the y- and z-axes. Similarly, an inclination of the wavefront portion S2 can be characterized by the angles $t_{x2}$ and $t_{y2}$, which are defined in the same way as $t_{x1}$ and $t_{y1}$ of the wavefront portion S1. Then, the inclination deviation between wavefront portions S1 and S2 of the wavefront S can be characterized by the difference values $\Delta t_x=t_{x1}-t_{x2}$ and $\Delta t_y=t_{y1}-t_{y2}$, which are commonly referred to as tilt and tip deviation values, respectively, between wavefront portions S1 and S2. Such tilt and tip deviation values can be determined using the invention, between those portions of the wavefront S that are superimposed on adjacent microlenses 11 within the optical component 1. For an optical component with hexagonal symmetry as considered in the present description, and when this optical component is used in a wavefront analyzer, a variation in tilt as well as a variation in tip, which affects a portion of wavefront superimposed on a single one of the microlenses, modifies both an interfringe pitch value and an orientation of the fringes in the interferograms in which the sub-beams that have passed through this microlens participate. For this reason, tilt deviation values are taken to mean both $\Delta t_x$ and $\Delta t_y$ differences, without distinction, throughout the present description.

Figure 3A:
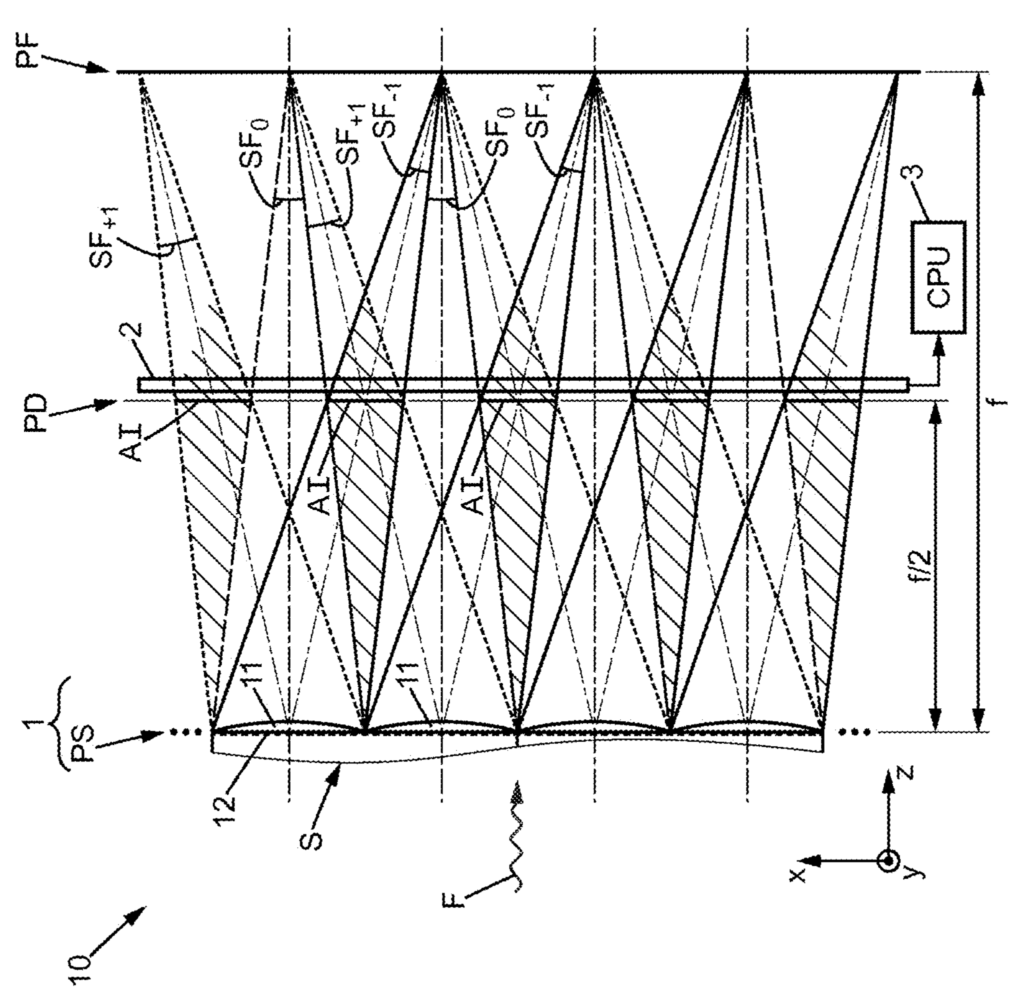
FIG. 3*a* is a longitudinal sectional view of a first wavefront analyzer conforming to the invention, called f/2 configuration.

In [FIG. 3*a*], F denotes the electromagnetic radiation beam incident on optical component 1, and $SF_{-1}$, $SF_0$ and $SF_{+1}$ denote three sub-beams produced by the diffraction grating of optical component 1 from beam F for each microlens 11. Because of the microlenses 11, all the sub-beams $SF_{-1}$, $SF_0$ and $SF_{+1}$ converge in the common focal plane of the microlenses, noted PF, at separate points. The focal plane PF is parallel to the superposition plane PS and distant from it by the focal length f. A sub-beam $SF_0$ corresponding to diffraction order 0, three further sub-beams $SF_{-1}$ each corresponding to diffraction order −1, and a further three sub-beams $SF_{+1}$ each corresponding to diffraction order +1 then come from each microlens 11. If the wavefront S is parallel to the xy-plane at this microlens 11, these seven sub-beams converge at points on the focal plane PF that are located at the vertices and center of a regular hexagon whose center is aligned with that of the microlens parallel to the z-axis: the sub-beam $SF_0$ converges at the center of the hexagon, and the six sub-beams $SF_{-1}$ and $SF_{+1}$ converge at their vertices. Because of the diffraction directions, the x-axis as shown in [FIG. 3*a*] is perpendicular to one of the axes of symmetry $A_{12}$ of the diffraction grating. It is also parallel to one of the axes of symmetry $A_{11}$ of the microlens array 11.

Figure 4A:
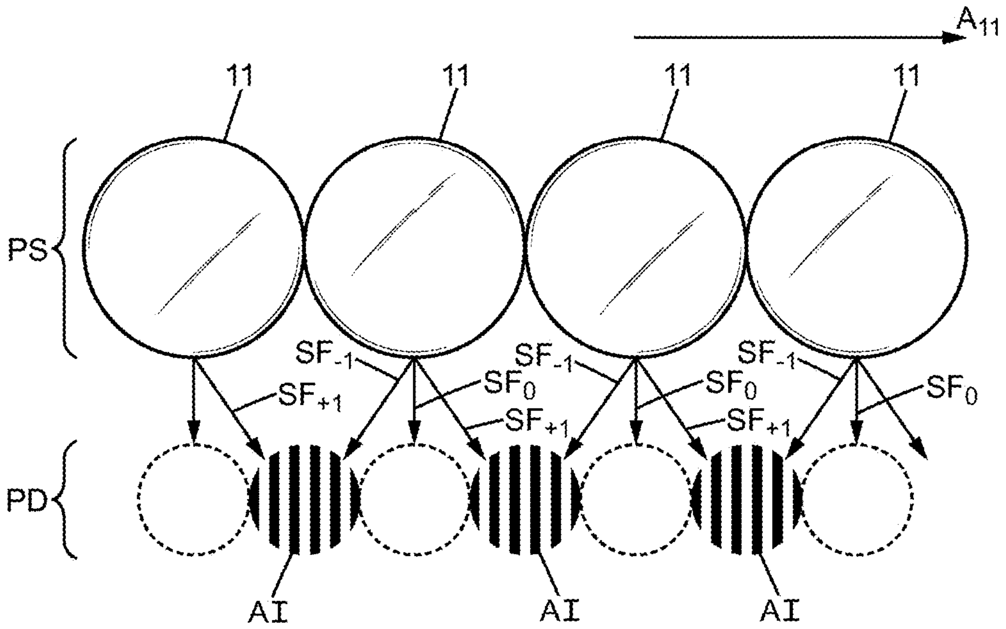
FIG. 4*a* shows the principle of interferogram formation by a wavefront analyzer which conforms to the invention.

For a first configuration of a wavefront analyzer 10 according to the invention, known as the f/2 configuration, the repetition pitch $p_{12}$ of the diffraction pattern along each axis $A_{12}$ of the diffraction grating is such that the point of convergence of each sub-beam $SF_{-1}$ or $SF_{+1}$ which originates from a microlens 11 is substantially superimposed, in the focal plane PF, on the point of convergence of the sub-beam $SF_0$ which originates from a neighboring microlens, as shown in [FIG. 3*a*]. To achieve this, the repetition pitch $p_{12}$ of the diffraction pattern along axes $A_{12}$, and the pitch $p_{11}$ of microlenses 11 along axes $A_{11}$, satisfy the nominal relationship: $p_{12}=2\cdot\lambda\cdot f/(3^{1/2}\cdot p_{11})$. Throughout this description, A denotes a wavelength value that is prescribed for the optical component 1, and therefore prescribed for each wavefront analyzer that is built up from this optical component. This prescribed value λ is the one to be adopted for the wavelength of the electromagnetic radiation of the beam $F_1$, during nominal use of the wavefront analyzer 10. The hatched areas in [FIG. 3*a*] show the superposition volumes between a sub-beam $SF_{+1}$ and a sub-beam $SF_{-1}$ from two neighboring 11 microlenses. A photodetection plane, which is parallel to the superposition plane PS and is denoted PD, with which the superposition volumes of the sub-beams have a maximum cross-sectional area, is located at distance f/2 from the superposition plane PS, downstream of the latter with respect to the direction of propagation of the radiation beam F. The wavefront analyzer 10 has the f/2 configuration when it comprises the optical component 1 and an image sensor 2 whose photosensitive surface coincides with the photodetection plane PD, halfway between the superposition plane PS and the focal plane PF. The f/2 value for the distance between the superposition plane PS and the image sensor 2 is optimal, also known as nominal, for the f/2 configuration of the wavefront analyzer. Within the photodetection plane PD, the sub-beams $SF_{-1}$ and $SF_{+1}$ from two neighboring microlenses 11 are superimposed in an interference area AI, where they produce an interferogram that is captured by the image sensor 2. [FIG. 4*a*] schematically shows this principle of forming interference areas AI for a direction with axis of symmetry $A_{11}$. The resulting interference areas AI are aligned in the photodetection plane PD parallel to the axes of symmetry $A_{11}$, thanks to the 30° angular offset between these axes of symmetry $A_{11}$ and the axes of symmetry $A_{12}$. The shape of the peripheral boundary of each interference area AI is altered to a small extent by the positions of the convergence points in the focal plane PF, depending on the local inclinations of the wavefront S at the superposition plane PS. The shape of the peripheral boundary of each interference area AI is also altered when the wavelength of the radiation beam F differs from the prescribed value λ as resulting from the nominal relationship provided above, the repetition pitch $p_{12}$ of the diffraction pattern and the pitch $p_{11}$ of the microlens array being intrinsic and fixed parameters for a given optical component. It is further altered when the photosensitive surface of the image sensor 2 is offset from the optimal photodetection plane PD. However, these alterations to the peripheral boundaries of the interference areas do not affect the content of the interferograms.

Figure 4B:
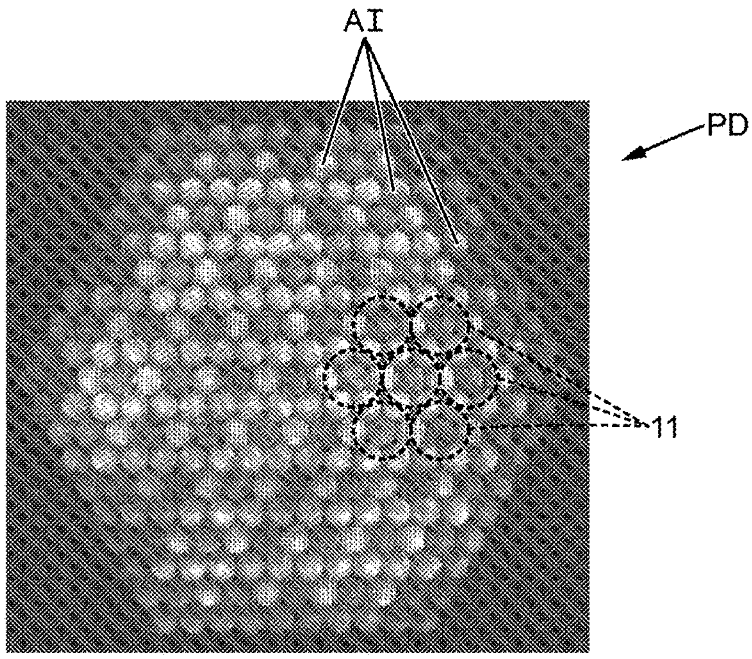
FIG. 4*b* shows an example of an image captured by a wavefront analyzer conforming to the invention.

The image sensor 2 is preferentially of a matrix type with a pitch of individual photodetector elements, commonly called pixels, in its photosensitive surface that is small enough to provide sufficient sampling of the interferograms within the interference areas AI. [FIG. 4*b*] shows an image as captured by sensor 2 during nominal use of wavefront analyzer 10 from [FIG. 3*a*], that is, with the f/2 configuration. This image therefore corresponds to the illumination in the photodetection plane PD. Each interference area AI contains a separate interferogram, and an indication of the position of the microlenses 11 is shown by superposition, in projection parallel to the z axis.

Figure 2:
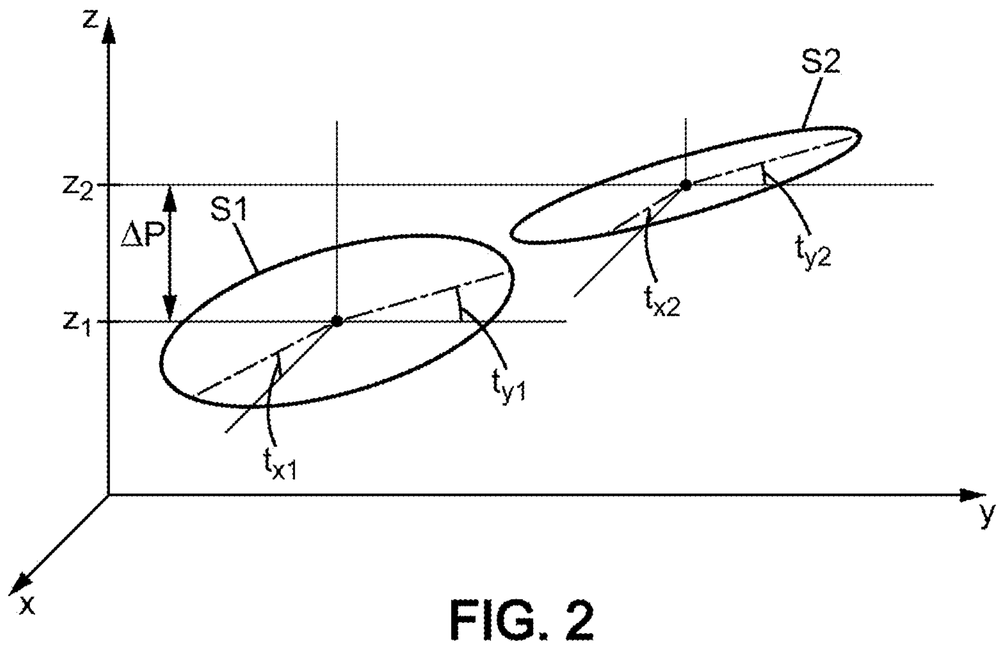
FIG. 2 shows wavefront parameters that can be determined using a wavefront analyzer in accordance with the invention.

Characterization of the shape of the wavefront S, as it exists at the level of the superposition plane PD, is given by analysis of the interferograms. Each interferogram provides differential information between the positions of the centers of the two microlenses 11 from which the two sub-beams $SF_{-1}$ and $SF_{+1}$ that formed this interferogram originate. The light intensity distribution within each interferogram, as captured by image sensor 2, is given by the following formula:

$$I = k \cdot \left\{1 + \cos\left[2\pi\left(\frac{4}{(\sqrt{3}\,p_{12}} \cdot u + \frac{\Delta P}{\lambda} + \frac{\Delta t_N}{\lambda} \cdot x + \frac{\Delta t_y}{\lambda} \cdot y\right)\right]\right\}$$

where ΔP is the piston deviation that exists between the parts of the wavefront S that are respectively at the level of one and the other of the two neighboring microlenses, as this ΔP deviation was introduced above with reference to [FIG. 2], $\Delta t_x$ and $\Delta t_y$ are the tilt deviations that exist between these portions of the wavefront S, also as they were introduced with reference to [FIG. 2], u is a Cartesian coordinate along an axis in the photodetection plane PD that is parallel to one of the axes symmetry of $A_{11}$ of the microlens array, k is a sensitivity scaling coefficient of the image sensor 2 that is positive and non-zero, and the parameters $p_{12}$ and λ are taken as defined above. Thus, the interference state at the center of the interferogram, that is, for x=y=u=0, provides the value of the piston deviation ΔP. All the piston deviation values ΔP that are deduced from the set of interferograms then provide a basic characterization of the shape of the wavefront S: they are the sagittal height values, along the z axis, of the wavefront S for the sampling mesh that is formed by the centers of the microlenses 11. Optionally, the tilt deviation values $\Delta t_x$ and $\Delta t_y$ can also be deduced from the interferograms, by extracting from each interferogram the orientation of the fringes that make it up and the corresponding inter-fringe pitch value. Such additional analysis of the fringe structures of interferograms is well known to the person skilled in the art, so there is no need to go into further detail here. It provides the inclinations of the planes tangent to the wavefront S at the centers of the microlenses 11. The deduction of all piston deviation values for the basic characterization of the wavefront, and optionally of all tilt deviation values for its further characterization, can be carried out automatically by a processing module 3, noted CPU in [FIG. 3*a*] and [FIG. 3*b*]. Such a processing module 3 can be programmed to first extract the interferograms from each image that is captured by the sensor 2, associating each interferogram with its position in the image, that is, its position relative to the microlens array 11, and then programmed to analyze each interferogram separately, in order to deduce the piston deviation value ΔP and possibly also the tilt deviation values.

Figure 3B:
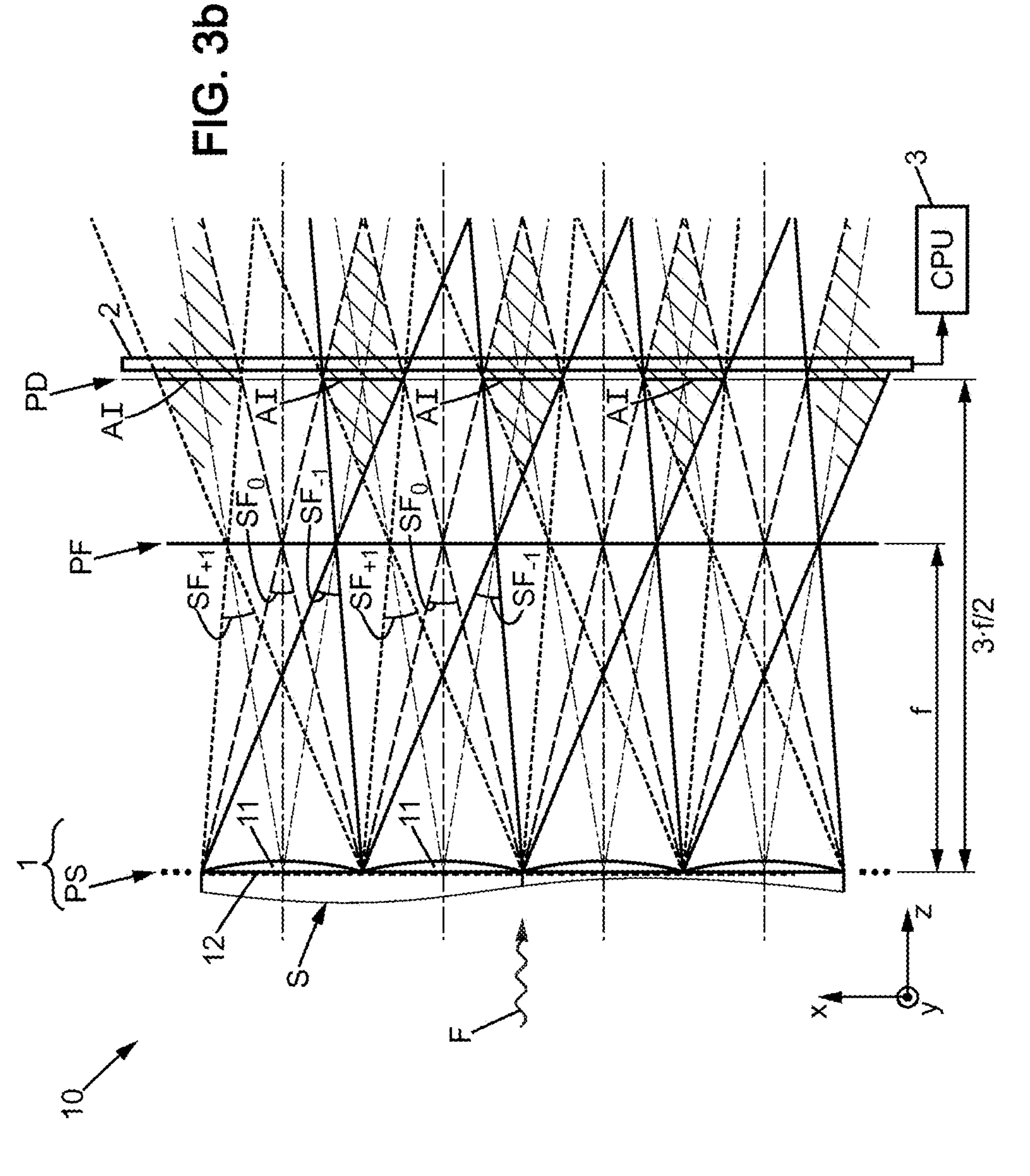
FIG. 3*b* corresponds to FIG. 3*a* for a second wavefront analyzer which also conforms to the invention, and called 3·f/2 configuration.

[FIG. 3*b*] shows an alternative embodiment of a wavefront analyzer which also conforms to the invention. The wavefront analyzer 10 in [FIG. 3*b*] has a 3·f/2 configuration. For this purpose, the optical component 1 still conforms to the description that was provided with reference to [FIG. 1], but it now satisfies the following new nominal relationship: $p_{12}=2\cdot 3^{1/2}\lambda\cdot f/p_{11}$. All previously introduced notations relating to the optical component 1 and the radiation to be analyzed, including the shape of the wavefront S, are retained identically. The hatched areas in [FIG. 3*b*] correspond to the new superposition volumes of the sub-beams $SF_{-1}$ and $SF_{+1}$ from neighboring 11 microlenses. However, these superposition volumes are now limited downstream to avoid additional superpositions with sub-beams $SF_0$. With the new nominal relationship, the pairs of sub-beams for which optical component 1 produces superpositions are identical to those in [FIG. 3*a*], except that these superpositions occur at a distance from the superposition plane PS that is greater than the focal length f. The position of the photodetection plane PD at which the interference areas AI are at their maximum is then at a distance of 3·f/2 from the superposition plane PS, still downstream of this superposition plane PS with respect to the direction of propagation of the radiation beam F, the two planes PD and PS still being parallel. This new position of the photodetection plane PD corresponds to the optimum, or nominal, position of the image sensor 2 for the 3·f/2 configuration of the wavefront analyzer 10. The optical operation of the wavefront analyzer 10, and the principle of analysis of the interferograms it produces, as described for the f/2 configuration, are identical for the 3·f/2 configuration. In particular, the light intensity distribution formula within each interferogram is the same for both f/2 and 3·f/2 configurations.

In the above-described embodiments of the invention, it is possible for sub-beams produced by optical component 1, but other than $SF_{-1}$ and $SF_{+1}$, to interfere with the latter within the interference areas AI. These other sub-beams correspond to higher diffraction orders generated by the diffraction grating, and are likely to reduce the contrast of the interferograms and hinder their analysis. When the diffraction pattern consists, in the superposition plane PS, of a disk 12 of diameter $d_{12}$ within which the diffraction grating produces a phase shift of +/−π for the radiation beam F (see description above with reference to [FIG. 1]), it may be advantageous for the diameter $d_{12}$ to be substantially equal to $7.66\cdot p_{12}\cdot 3^{12}/(6\cdot\pi)$, particularly for the f/2 configuration when $p_{12}=2\cdot\lambda\cdot f/(3^{1/2}\cdot p_{11})$, or for the 3·f/2 configuration when $p_{12}=2\cdot 3^{1/2}\cdot\lambda\cdot f/p_{11}$. Such dimensioning of the diffraction pattern reduces or cancels out the intensities of some of the higher-order sub-beams that are likely to reach the interference areas AI.

Figure 5A:
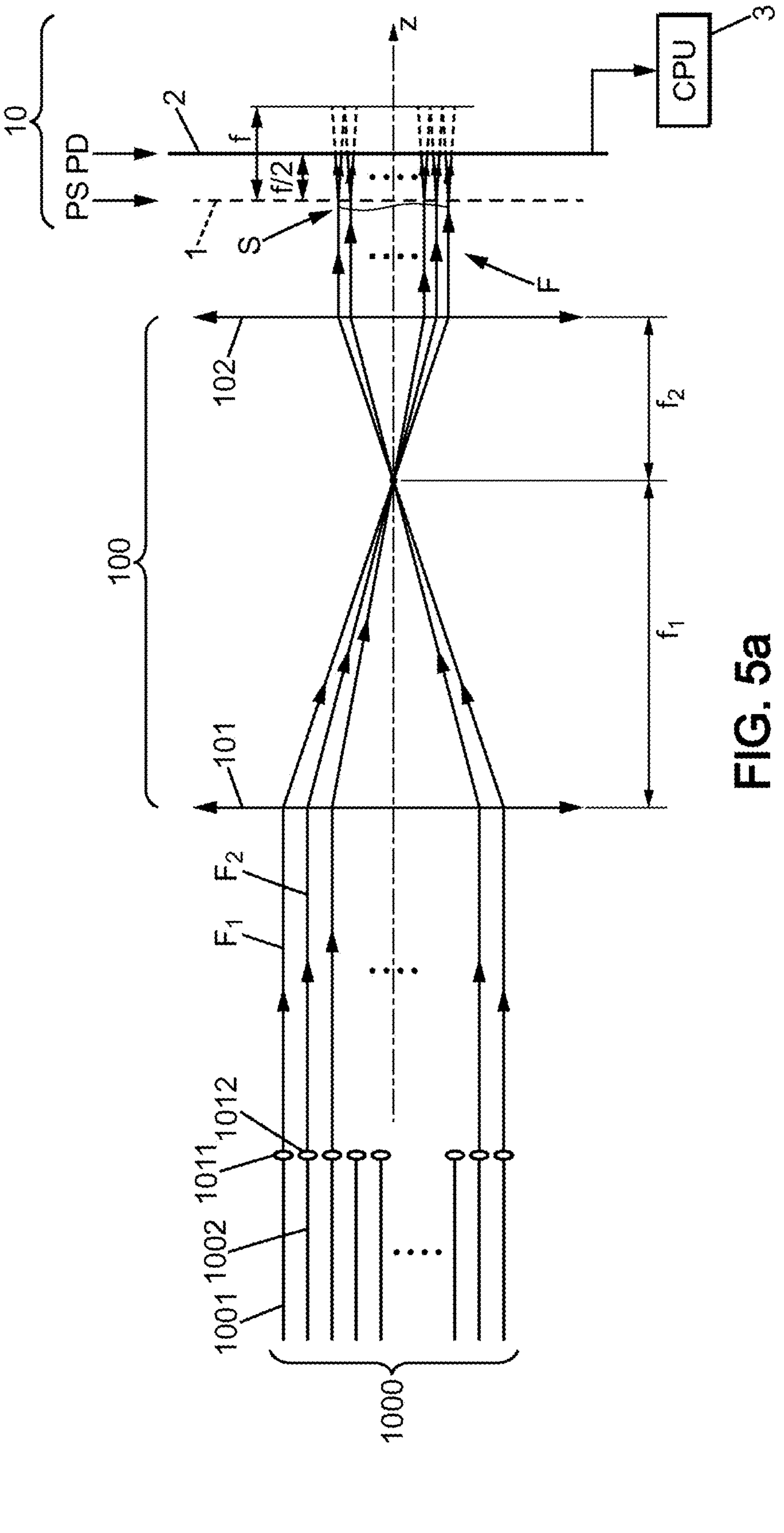
FIG. 5*a* shows a first use of a wavefront analyzer according to the invention, for adjusting beamlets of electromagnetic radiation that are produced by several separate laser sources.

[FIG. 5*a*] shows a first possible use of a wavefront analyzer 10 in accordance with the invention, to achieve a coherent combination of light beamlets which are produced by a set of fiber laser sources 1000. The laser sources 1000 are capable of interfering with one another, and are arranged in parallel so that the output sections of the optical fibers 1001, 1002, . . . are substantially all arranged in the same plane perpendicular to the z axis. Each optical fiber 1001, 1002, etc. is equipped with an output lens 1011, 1012, etc., so that the light beamlet $F_1$, $F_2$, etc. coming from this optical fiber is collimated. There is no limit to the number of separate laser sources that produce beamlets in parallel, for example, of the order of several hundred thousand. All the beamlets $F_1$, $F_2$, etc., produced by the laser sources 1000 are brought to impinge on the optical component 1 of the wavefront analyzer 10, substantially parallel to the z axis. Together, they form the radiation beam F mentioned above. The optical component 1 has at least as many microlenses 11 as the number of laser sources 1000, and the transverse distribution of the outputs of the optical fibers 1001, 1002, etc. forms a hexagonal array, to match the arrangement of the microlenses 11 in the microlens array. In this way, a single optical fiber is directed to a dedicated microlens 11. References 101 and 102 refer to two converging lenses, with their respective focal lengths $f_1$ and $f_2$. They are optionally arranged to form an afocal optical system, which is designated by reference 100. In other words, the image focus of lens 101 is superimposed on the object focus of lens 102. The two lenses 101 and 102 have sufficient transverse extensions to contain all the beamlets $F_1$, $F_2$, etc., so that the function of the afocal optical system 100 is to adapt the pitch of the hexagonal grating of the optical fiber outputs 1001, 1002, etc. to the pitch $p_{11}$ of the microlens array 11. Together with the afocal optical system 100, the laser sources 1000 form the source assembly referred to in the general part of this description. The wavefront analyzer 10 can be of f/2 or 3·f/2 configuration. Such an implementation makes it possible to determine the piston deviations ΔP and tilt deviations that are present between neighboring optical fibers, when all the fiber laser sources 1000 are monochromatic with the same common wavelength that substantially coincides with the prescribed value λ of the wavefront analyzer 10. A particular case of this first use of a wavefront analyzer 10 which is in accordance with the invention is where the laser sources 1000 are of the pulsed type, each to deliver a very short elementary pulse of radiation, for example of the order of a picosecond or less. Once the piston deviations ΔP measured in this way have been compensated for, for example using a set of phase shifters not shown, the elementary pulses can be superimposed to form a single resultant radiation pulse with very high power. The respective directions of propagation of the elementary pulses can also be determined, using the tilt deviations existing at the lenses, to make them all parallel to one another.

Figure 5B:
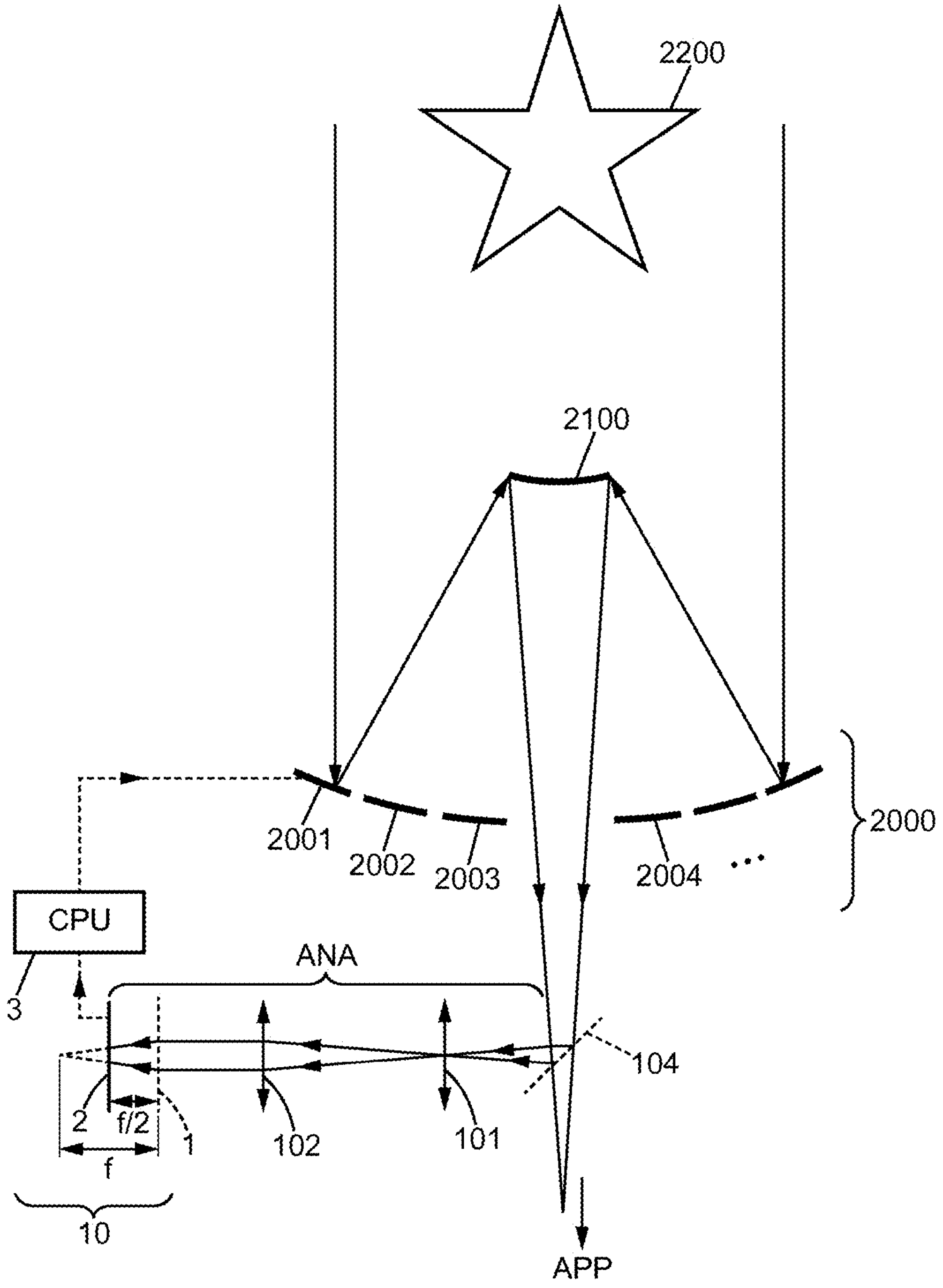
FIG. 5*b* shows a second use of a wavefront analyzer conforming to the invention, for adjusting the positions of separate segments of a Keck-type telescope mirror.

[FIG. 5*b*] shows another possible use for a wavefront analyzer conforming to the invention, for measuring height and inclination deviations that may be present between adjacent segments of a Keck-type telescope mirror. Depending on the deviations measured in this way, the relative positions of the mirror segments can be readjusted, so that a wavefront produced by reflection on the complete mirror is free of steps or slope discontinuities.

References 101 and 102 in [FIG. 5*b*] still refer to two converging lenses. They are located within an analysis channel, ANA, which leads to the wavefront analyzer 10. A semi-reflective plate 104 couples this ANA analysis channel to a telescope output, in addition to an APP application channel. Lens 101 is positioned in the image of the telescope focal plane formed by the semi-reflective plate 104, and lens 102 is positioned downstream of lens 101, at a distance from the latter equal to the focal length of lens 102. In this way, the lens 102 ensures that the radiation emerging from the telescope is collimated when it reaches the optical component 1 of the wavefront analyzer 10, if any telescope defects are not taken into account or have been corrected. The telescope may consist of a primary mirror 2000 and a secondary mirror 2100. The primary mirror 2000 is made up of all the adjacent mirror segments 2001, 2002, 2003, 2004, etc. These mirror segments are juxtaposed in a hexagonal array to form the primary mirror 2000, in order to use a wavefront analyzer optical component 1 as described above. The focal length of lens 101 is selected so as to form, by means of secondary mirror 2100 and the two lenses 101 and 102, an image of primary mirror 2000 on the microlens array of optical component 1. In addition, this optical component 1 is oriented and transversely adjusted in position so that the image of each of the mirror segments 2001, 2002, 2003, 2004, etc. is superimposed on a single one of the microlenses 11. In the example shown, the wavefront analyzer 10 has the f/2 configuration, but a wavefront analyzer with a 3·f/2 configuration can be used alternatively. The purpose of the present application of the invention is to determine the relative positional errors of the individual mirror segments 2001, 2002, 2003, 2004, etc. The radiation used for this can come from a 2200 star located at a very great distance from the telescope, and towards which the telescope is turned. Thus, the star 2200, the telescope, the semi-reflective plate 104 and the lenses 101 and 102 constitute the source assembly within the meaning of the general part of the present description. Each interferogram can then be used to determine the piston deviation ΔP between the light beams reflected by two adjacent mirror segments. This piston deviation is twice the height difference between the two mirror segments. Each interferogram can also be used to calculate the deviation in inclination between the two mirror segments. The heights of mirror segments 2001, 2002, 2003, 2004, etc., and possibly also their inclinations, can then be adjusted according to the measurement values supplied by processing module 3 for piston deviations ΔP, and possibly also for tilt deviations $\Delta t_x$ and $\Delta t_y$, in order to reduce or cancel the height and inclination deviations present between neighboring mirror segments.

It is understood that the invention can be reproduced by modifying secondary aspects of the embodiments that have been described in detail above, while retaining at least some of the cited advantages. In particular, the following modifications can be implemented:

- instead of being superimposed on the microlens array, the diffraction grating can be optically conjugated with it, in particular using an imaging system which is upstream of the microlens array, and adapted to produce an image of the diffraction grating on the microlens array;
- the diffraction grating, when it is of the phase grating type, can have more than two discrete phase shift values which are different;
- the diffraction grating can be of a type with amplitude variation instead of phase variation, in particular with more than two discrete values of amplitude transmission which are different, thus being able to approximate a diffraction grating with spatial variation of amplitude transmission which is sinusoidal;
- the microlenses may not be contiguous with one another in the superposition plane, particularly when their individual diameter is smaller than their juxtaposition pitch along the axes of symmetry of their array;
- the values of the optical component parameters, and the distance between the image sensor and the superposition plane in the wavefront analyzer, may differ from the nominal values and relationships quoted, while remaining within the ranges specified in the claims. In particular, the wavelength value of the radiation to be analyzed can differ from the A value prescribed for the optical component used, as long as the grating pitch is within the range corresponding to the wavelength of the radiation for the f/2 or 3·f/2 configuration used;

an optical component conforming to the invention can be used in optical systems other than wavefront analyzers; and a wavefront analyzer conforming to the invention can be used for applications other than those described with reference to [FIG. 5*a*] and [FIG. 5*b*], in particular to produce adaptive or active optics.

The invention claimed is:

1. An optical component comprising:

a hexagonal diffraction grating with a repeating pitch (p12) of a diffraction pattern along three axes of symmetry (A12) of the diffraction grating, characterized in that it further comprises:

a microlens array, also hexagonal, made up of identical converging microlenses, and having a microlens pitch (p11) along three axes of symmetry (A11) of the microlens array, the optical component being arranged so that the diffraction grating is superimposed on the microlens array in a plane called the superposition plane (PS), or in that an image of the diffraction grating is superimposed on the microlens array in the superposition plane, the diffraction grating and microlens array being oriented so that in the superposition plane (PS), each axis of symmetry (A12) of the diffraction grating, or an image of each axis of symmetry of the diffraction grating, is angularly offset from one of the axes of symmetry (A11) of the microlens array by an angle which is between 10° and 50°, and a quotient of the microlens pitch (p11) over the repetition pitch of the diffraction pattern (p12), or over a repetition pitch of an image of the diffraction pattern in the superposition plane (PS), is between 2 and 18, values 2 and 18 being inclusive.

2. The optical component according to claim 1, wherein an individual size of the microlenses parallel to the superposition plane (PS) is such that any two of the microlenses that are adjacent in the microlens array are contiguous.

3. The optical component according to claim 1, wherein the diffraction grating is carried by the microlens array, in particular engraved or printed on the microlens array or on a transparent film, or on a rigid transparent substrate, said film or substrate being bonded to the microlens array, or the diffraction grating is inscribed, in particular by photoinscription, in the microlens array or in a transparent film or rigid transparent substrate which is bonded to the microlens array.

4. The optical component according to claim 1, wherein at least one of the diffraction grating and the microlens array is realized by means of a spatial light modulator, preferably both the diffraction grating and the microlens array are realized together by means of the same spatial light modulator.

5. The optical component according to claim 1, further comprising an indication of a prescribed wavelength value λ for a beam (F) of electromagnetic radiation to be analyzed which is intended to pass through the optical component when using said optical component in an interference wavefront analyzer, said optical component producing during said use interference between sub-beams (SF−1, SF+1) emerging from the diffraction grating and having passed through neighboring microlenses in the microlens array, the repetition pitch of the diffraction pattern (p12), or the repetition pitch of the diffraction pattern image in the superposition plane (PS), being between λ·f/(2·31/2·p11) and 4·λ·f/(31/2·p11), where f is a focal length of each microlens and p11 is the microlens pitch, so that interference exists in a plane that is parallel to the superposition plane and distant from said superposition plane by f/2, or the repetition pitch of the diffraction pattern (p12), or the repetition pitch of the image of the diffraction pattern, in the superposition plane (PS), being between 4·λ·f/(31/2·p11) and 8·31/2·λ·f/p11, so that the interference exists in a plane which is parallel to the superposition plane and distant from said superposition plane by 3·f/2.

6. The optical component according to claim 5, wherein the diffraction pattern is adapted to produce, on a spectral component of the radiation beam (F) to be analyzed which has the prescribed value λ as wavelength value, a phase shift which is substantially equal to +/−pi radians, between two complementary zones (Z1, Z2) within the diffraction pattern and for a direction of propagation of said radiation beam which is perpendicular to the superposition plane (PS).

7. A wavefront interference analyzer, comprising:

an optical component according to claim 1; and an image sensor, which has a flat photosensitive surface and is arranged so that the photosensitive surface is parallel to the superposition plane (PS) of the optical component, so that interferograms produced on said photosensitive surface by a beam (F) of electromagnetic radiation to be analyzed which passes through the optical component towards the image sensor when using the wavefront analyzer, are captured by said image sensor.

8. The wavefront analyzer according to claim 7, further comprising:

a processing module, adapted to determine piston deviation values that exist at the superposition plane (PS) in a wavefront(S) of the radiation beam (F) to be analyzed, from the interferograms captured by said image sensor.

9. The wavefront analyzer according to claim 8, wherein the processing module is adapted to derive a value for the piston deviation existing in the wavefront(S) between two zones of said wavefront which are superimposed on two neighboring microlenses, from a fringe transverse shift existing in one of the interferograms which corresponds to said two microlenses.

10. The wavefront analyzer according to claim 9, wherein the processing module is further adapted to derive values of tilt deviations existing between the two areas of the wavefront(S) which are superimposed on the two neighboring microlenses, from a fringe orientation and an interfringe pitch, respectively, existing in the interferogram which corresponds to said two microlenses.

11. The wavefront analyzer according to claim 7, and a separation distance between the superposition plane (PS) and the photosensitive surface of the image sensor is between f/8 and 5·f/8 if the repetition pitch of the diffraction pattern (p12), or the repetition pitch of the image of the diffraction pattern in the superposition plane, is between λ·f/(2·31/2·p11) and 4·λ·f/(31/2·p11), or the separation distance between the superposition plane (PS) and the photosensitive surface of the image sensor is between 5·f/4 and 15·f/8 if the repetition pitch of the diffraction pattern (p12), or the repetition pitch of the diffraction pattern image in the superposition plane, is between 4·λ·f/(31/2·p11) and 8·31/2·λ·f/p11.

12. A method for analyzing a wavefront(S) of a beam (F) of electromagnetic radiation, comprising the following steps:

providing an optical component which is in accordance with claim 1;

directing the beam (F) of radiation through the optical component;

arranging an image sensor downstream of the optical component with respect to a propagation direction of the radiation beam (F), so that a photosensitive surface of the image sensor intersects superposition volumes of sub-beams (SF−1, SF+1) which are produced by the optical component from the radiation beam;

activating the image sensor to capture interferograms; and from the captured interferograms, determining piston deviation values that exist at the superposition plane (PS) in the wavefront(S) of the radiation beam (F).

13. The method as claimed in claim 12, further comprising: an initial step in which one of a source assembly of the beam (F) of radiation and the optical component is selected relative to the other such that a wavelength value of the source assembly is close to the prescribed value λ of the optical component, so as to produce the interferograms, and wherein the image sensor is arranged downstream of the optical component to form a wavefront analyzer.

14. The method according to claim 12, wherein parts of the radiation beam (F) which pass through different microlenses are generated by respective separate sources, in particular by separate fiber sources, and more particularly by separate fiber laser sources.

15. The method according to claim 12, wherein the radiation is reflected simultaneously by juxtaposed segments of a mirror, and for each segment of the mirror, a portion of the radiation reflected by said mirror segment passes through one of the microlenses in a one-to-one correspondence between the mirror segments and the microlenses, and the method further comprises:

from the captured interferograms, also determining tilt deviation values that exist at the superposition plane (PS) in the wavefront(S) of the radiation beam (F); and calculating height and tilt deviations between two adjacent segments of the mirror, based on the determined piston and tilt deviation values.

* * * * *